(12) United States Patent
Lorenson et al.

(10) Patent No.: US 10,801,264 B2
(45) Date of Patent: Oct. 13, 2020

(54) ON-BOTTOM DOWNHOLE BEARING ASSEMBLY

(71) Applicant: IMPULSE DOWNHOLE SOLUTIONS LTD., Edmonton (CA)

(72) Inventors: Troy Lorenson, Edmonton (CA); Kevin Leroux, Beaumont (CA); Dwayne Parenteau, Edmonton (CA); Doug Kinsella, Edmonton (CA)

(73) Assignee: IMPULSE DOWNHOLE SOLUTIONS LTD., Edmonton, CA (US)

( * ) Notice: Subject to any disclaimer, the term of this patent is extended or adjusted under 35 U.S.C. 154(b) by 178 days.

(21) Appl. No.: 15/751,958

(22) PCT Filed: Aug. 22, 2016

(86) PCT No.: PCT/CA2016/050988
§ 371 (c)(1),
(2) Date: Feb. 12, 2018

(87) PCT Pub. No.: WO2017/027983
PCT Pub. Date: Feb. 23, 2017

(65) Prior Publication Data
US 2018/0230749 A1 Aug. 16, 2018

Related U.S. Application Data

(60) Provisional application No. 62/207,679, filed on Aug. 20, 2015.

(51) Int. Cl.
*E21B 4/00* (2006.01)
*E21B 4/14* (2006.01)
(Continued)

(52) U.S. Cl.
CPC ............ *E21B 4/003* (2013.01); *E21B 4/02* (2013.01); *E21B 4/14* (2013.01); *E21B 21/10* (2013.01); *F16C 17/10* (2013.01); *F16C 17/26* (2013.01)

(58) Field of Classification Search
CPC ... E21B 4/00; E21B 4/02; E21B 4/003; E21B 4/14; E21B 21/10; E21B 7/24; E21B 28/00; E21B 47/01; E21B 17/07
See application file for complete search history.

(56) References Cited

U.S. PATENT DOCUMENTS 2,250,912 A 7/1941 Hudson
2,329,912 A 9/1943 Kent
(Continued)

FOREIGN PATENT DOCUMENTS

CA 2255065 C 1/2007
CA 2312341 C 8/2007
(Continued)

OTHER PUBLICATIONS

Drill on Target Directional Services Inc., "Drill on Target: Advanced Drilling Solutions", published at least as early as Aug. 20, 2015 (5 pages).
(Continued)

*Primary Examiner* — David Carroll
(74) *Attorney, Agent, or Firm* — Jenna L. Wilson; Wilson Lue LLP

(57) ABSTRACT

A bearing assembly for use in a bottom hole assembly includes a reactive portion and a fluid restrictor portion, the portions being operatively coupled by a mandrel of the bottom hole assembly. The fluid restrictor portion comprises a piston valve component disposed in a stationary valve component, the piston valve component and stationary valve component arranged to generate fluid pressure variations,
(Continued)

the fluid pressure variations causing axial movement of the piston valve component. The reactive portion comprises an oscillation assembly mounted between a housing and the mandrel, the oscillation assembly responsive to movement of the mandrel in the housing applying force to the oscillation assembly. The mandrel of the bottom hole assembly is directly mounted to the piston valve component.

15 Claims, 7 Drawing Sheets

(51) Int. Cl.
  *E21B 21/10* (2006.01)
  *F16C 17/10* (2006.01)
  *F16C 17/26* (2006.01)
  *E21B 4/02* (2006.01)

(56) References Cited

U.S. PATENT DOCUMENTS

| | | |
|---|---|---|
| 2,738,956 A | 3/1956 | Bielstein |
| 2,743,083 A | 4/1956 | Zublin |
| 2,746,721 A | 5/1956 | Moore |
| 2,780,438 A | 2/1957 | Bielstein |
| 2,896,916 A | 7/1959 | Clavier |
| 2,942,851 A | 6/1960 | Beck |
| 3,096,833 A | 7/1963 | Bodine |
| 3,216,514 A | 11/1965 | Nelson |
| 3,270,822 A | 9/1966 | Cleary |
| 3,640,351 A | 2/1972 | Coyne |
| 3,894,818 A | 7/1975 | Tschirky |
| 3,899,033 A | 8/1975 | Van Huisen |
| 3,933,209 A | 1/1976 | Sweeney |
| 3,941,196 A | 3/1976 | Curington |
| 4,080,115 A | 3/1978 | Sims |
| 4,384,625 A | 5/1983 | Roper |
| 4,817,739 A | 4/1989 | Jeter |
| 4,819,745 A | 4/1989 | Walter |
| 4,830,122 A | 5/1989 | Walter |
| 4,890,682 A | 1/1990 | Worrall |
| 4,953,595 A | 9/1990 | Kotlyar |
| 4,979,577 A | 12/1990 | Walter |
| 5,009,272 A | 4/1991 | Walter |
| 5,048,622 A | 9/1991 | Ide |
| 5,139,400 A | 8/1992 | Ide |
| 5,190,114 A | 3/1993 | Walter |
| 5,662,180 A | 9/1997 | Coffman |
| 6,571,870 B2 | 6/2003 | Zheng |
| 6,659,202 B2 | 12/2003 | Runquist |
| 7,219,752 B2 | 5/2007 | Wassell |
| 8,181,719 B2 | 5/2012 | Bunney |
| 8,201,633 B2 * | 6/2012 | Hilliard ............... E21B 23/006 166/332.8 |
| 2001/0054515 A1* | 12/2001 | Eddison ............... E21B 4/02 175/56 |
| 2004/0089461 A1* | 5/2004 | Cioceanu ............. E21B 4/10 173/90 |
| 2005/0284665 A1* | 12/2005 | Shears ................. E21B 31/107 175/57 |
| 2011/0073374 A1* | 3/2011 | Bunney ................ E21B 4/02 175/107 |
| 2011/0198126 A1* | 8/2011 | Swietlik .............. E21B 17/073 175/55 |
| 2012/0118648 A1* | 5/2012 | Lorger ................ E21B 4/14 175/296 |
| 2015/0211318 A1* | 7/2015 | Redlinger ............. E21B 4/02 166/298 |
| 2016/0281449 A1* | 9/2016 | Lorenson ............. E21B 4/02 |
| 2016/0362938 A1* | 12/2016 | Gan ...................... E21B 10/36 |

FOREIGN PATENT DOCUMENTS

| | | |
|---|---|---|
| CA | 2680895 A1 | 3/2011 |
| CA | 2487380 C | 2/2013 |
| EP | 0335543 A1 | 10/1989 |
| GB | 2059481 A | 4/1981 |
| WO | 94/016189 A1 | 7/1994 |
| WO | 2012/138383 A2 | 10/2012 |

OTHER PUBLICATIONS

Wedel, Ryan et al., "Mitigating Bit-Related Stick-Slip With a Torsional Impact Hammer", 2011 AADE National Technical Conference and Exhibition held at the Hilton Houston North Hotel, Houston, Texas, Apr. 12-14, 2011 (5 pages).

Powell, Scott et al., "Fluid Hammer Increases PDC Performance through Axial and Torsional Energy at the Bit", SPE 166433, SPE Annual Technical Conference and Exhibition, New Orleans, Louisiana, USA, Sep. 30-Oct. 2, 2013, pp. 1-7.

National Oilwell Varco, "6 ¾" FluidHammer—Operating Specifications", published at least as early as Nov. 2015, 1 pg.

NOV Wellbore Technologies, "Agitator(TM) Systems", published at least as early as Feb. 2016, 5 pgs.

* cited by examiner

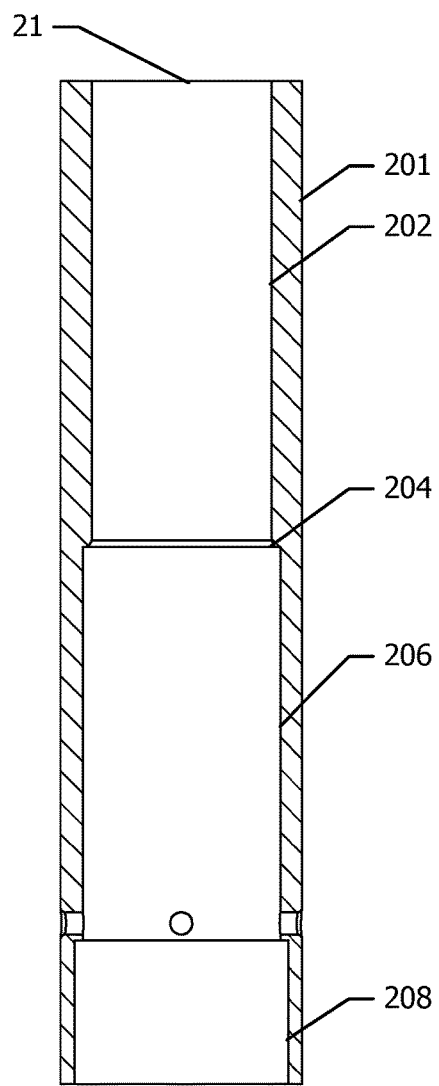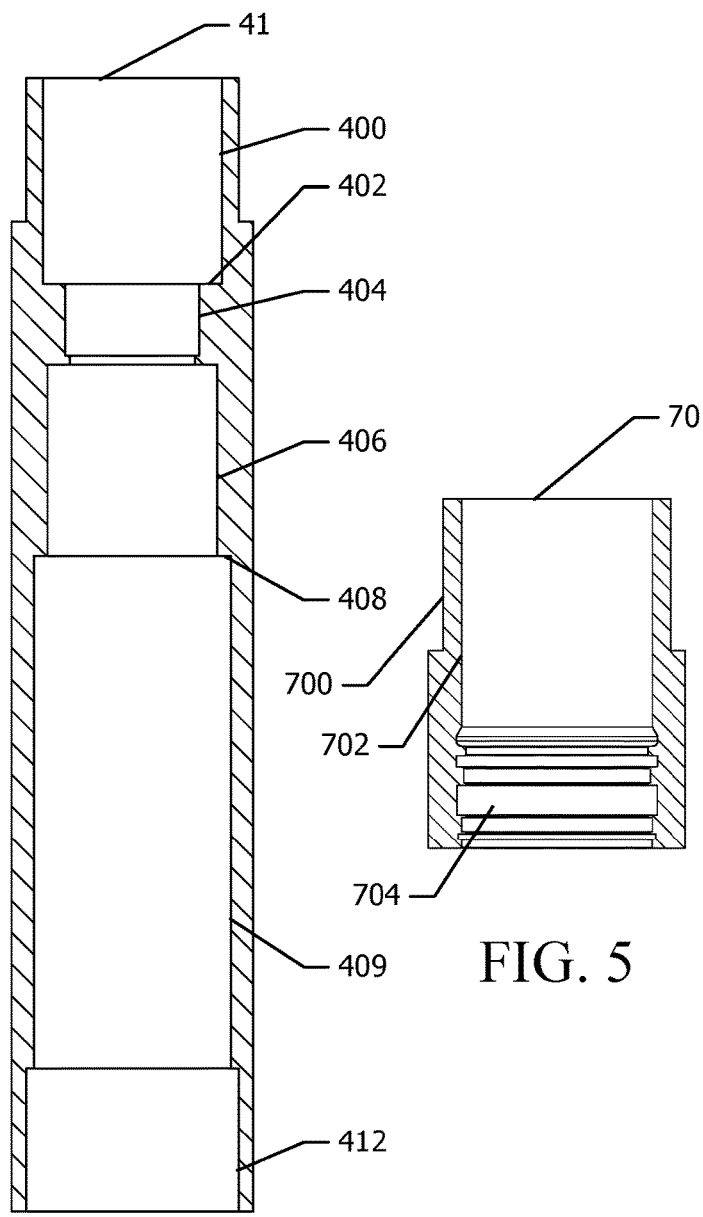
FIG. 3
FIG. 4
FIG. 5

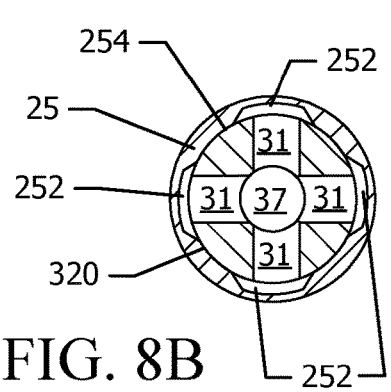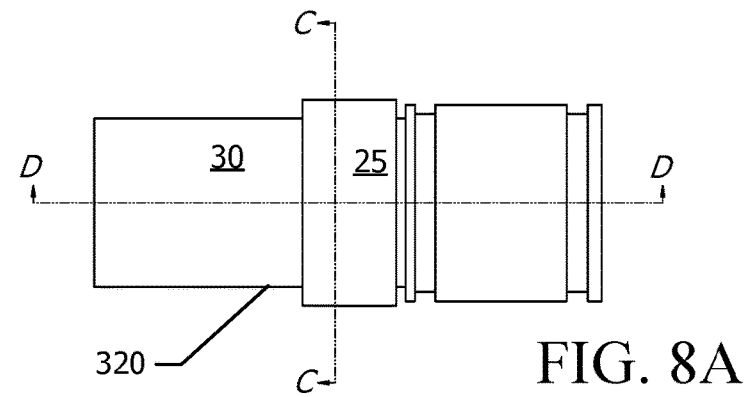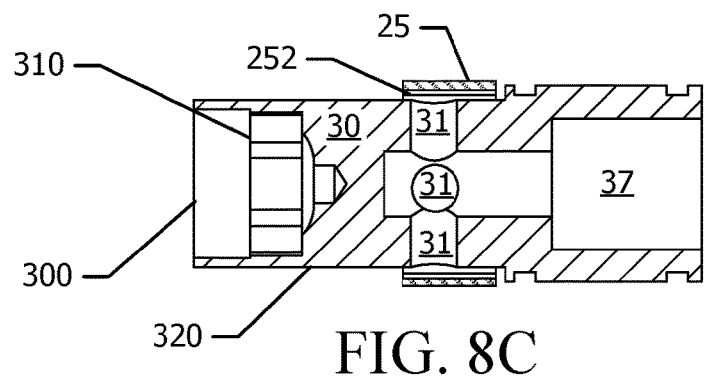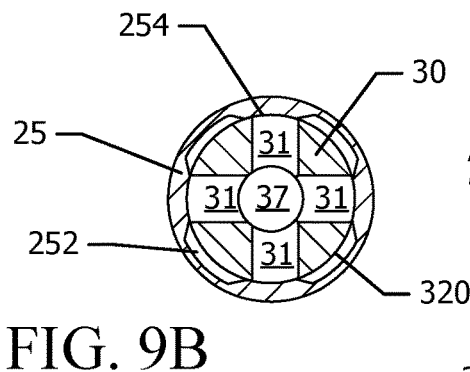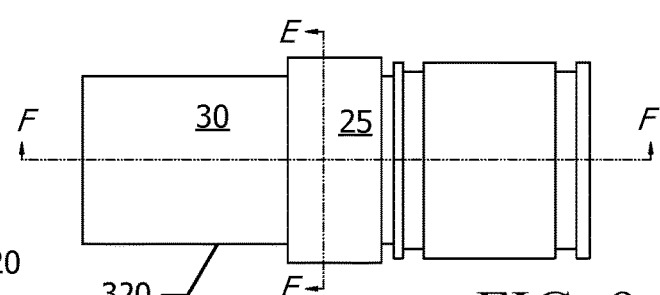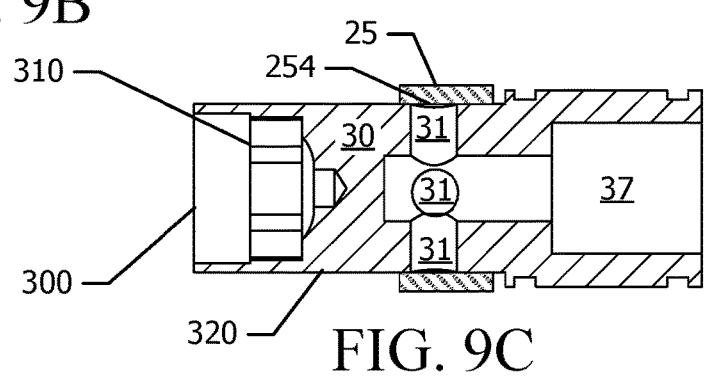

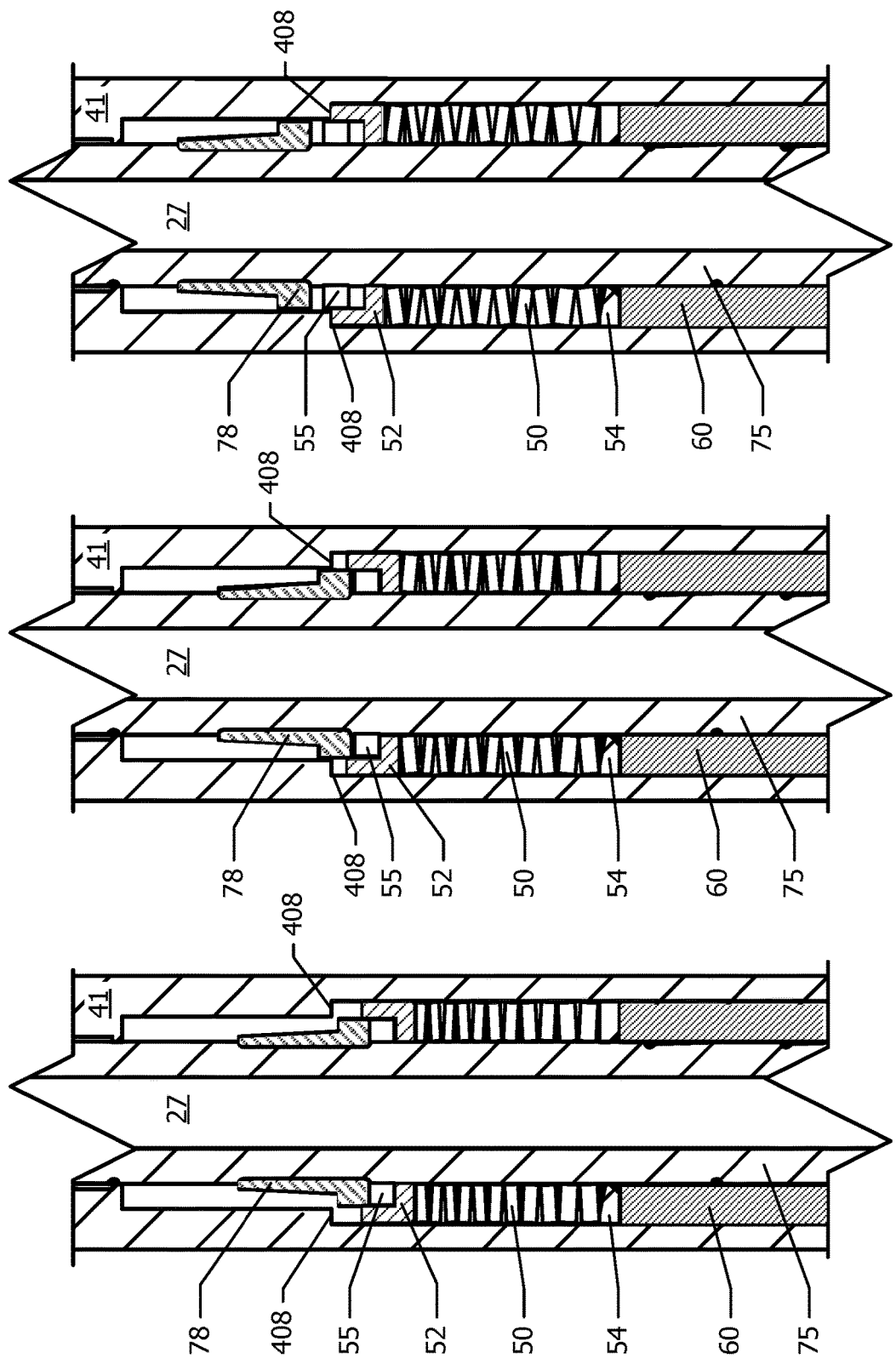

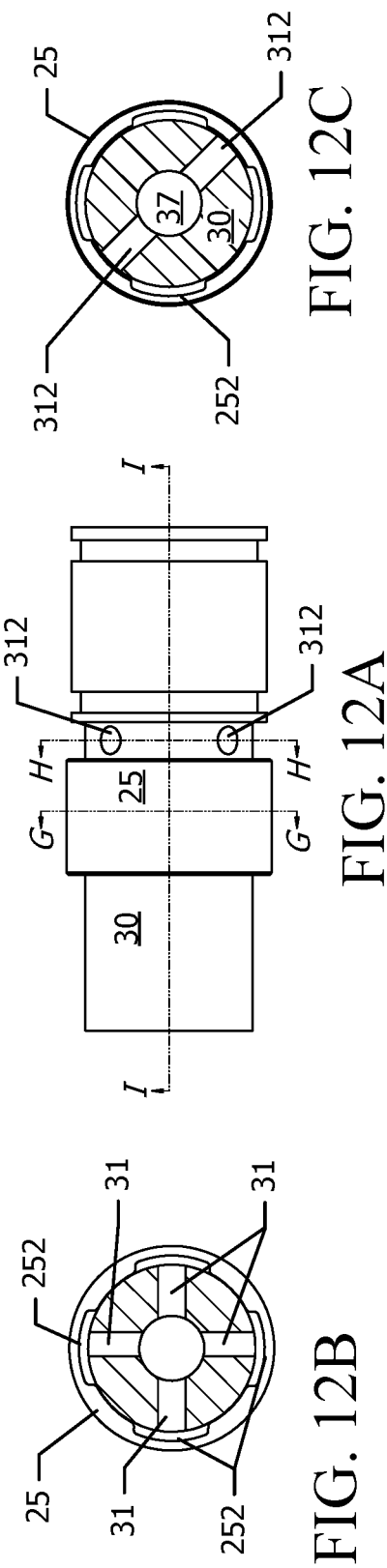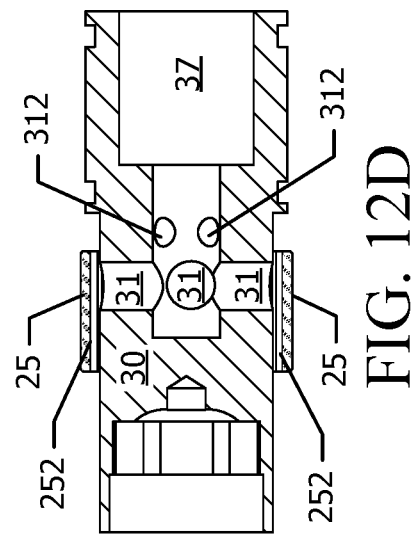

ON-BOTTOM DOWNHOLE BEARING ASSEMBLY

REFERENCE TO PRIOR APPLICATIONS

This application claims priority from U.S. Application No. 62/207,679, filed Aug. 20, 2015, the entirety of which is incorporated herein by reference.

TECHNICAL FIELD

The present disclosure relates to downhole drilling assemblies for use in oil and gas production and exploration, and in particular downhole bearing assemblies.

TECHNICAL BACKGROUND

In oil and gas production and exploration, downhole drilling can be accomplished with a downhole drill at the end of a drill string. The drill string is powered by a mud motor, such as a Moineau principle motor, driven by drilling fluid (e.g., drilling mud) pumped into the drill string. On exiting the drill string at the drill bit, the drilling fluid can also usefully improve drilling performance by flushing out drill cuttings that may otherwise interfere with the bottom hole assembly (BHA) of the drill string, cooling the drill bit, and providing fluid pressure to prevent formation fluids from entering the wellbore.

One challenge in directional drilling is the problem of maintaining sufficient weight on the drill bit and engagement of the drill bit with the surface to be drilled, which in part determines the efficiency of the drilling operation (e.g., the rate of penetration). When drilling downward vertically, the inherent weight of the drill pipe, and the added weight provided by collars, heavy weight drill pipe, etc., contribute to weight transfer to the bit due to gravity. When drilling laterally, however, gravity does not have the same beneficial effect. To compensate, force can be applied at the top of the drill string to induce the lateral portion of the string to advance; however, the friction resulting from the weight of the drill string on the floor of the lateral well bore resists advancement. The drill pipe in the lateral section may experience compression or buckling, causing a buildup of torque in the drill string. When the torque is finally released, the recoil of the string against the interior surfaces of the well may be violent enough to damage components of the BHA. Alternatively, excessive weight on the bit may cause the motor to stall, increasing the risk of damage to the stator.

To address challenges experienced in drilling, it has been proposed to apply strong percussive forces, induced by variations in drilling fluid pressure, to the bottom hole assembly. It is generally believed, for example, that applying a hammer-like effect will assist in drilling hard rock, mitigate problems such as stalling, and improve rate of penetration. Strong percussive force at the BHA, however, may disrupt sensitive measurement while drilling (MWD) instruments, and generating percussive forces by varying fluid pressure causes reductions in downstream fluid pressure.

BRIEF DESCRIPTION OF THE DRAWINGS

In drawings which illustrate by way of example only embodiments of the present disclosure, in which like reference numerals describe similar items throughout the various figures.

FIG. 3 is a lateral cross-sectional view of a fluid restrictor housing of the downhole bearing assembly of FIG. 1.

FIG. 4 is a lateral cross-sectional view of a reactive portion housing of the downhole bearing assembly of FIG. 1.

FIG. 5 is a lateral cross-sectional view of a seal housing of the downhole bearing assembly of FIG. 1.

FIGS. 8A, 8B, and 8C are an axial cross-sectional view, a side elevation, and a lateral cross-sectional view, respectively, of a cooperating stationary valve component and piston valve component in a first state.

FIGS. 9A, 9B, and 9C are an axial cross-sectional view, a side elevation, and a lateral cross-sectional view, respectively, of a cooperating stationary valve component and piston valve component in a second state.

FIGS. 11A, 11B, and 11C are cross-sectional views illustrating a portion of the downhole bearing assembly comprising the reactive portion in different states.

FIGS. 12A, 12B, 12C, and 12D are views of a cooperating stationary valve component and piston valve component, where the piston valve component includes a bypass.

DETAILED DESCRIPTION OF THE INVENTION

As explained above, directional drilling presents challenges beyond those generally experienced during vertical drilling, such as the effect of friction between the interior surface of the lateral well bore and the drill string components, and buckling or compression of the lateral section of the drill pipe. The latter phenomenon can create a buildup of stored energy in the drill pipe when torque continues to be applied to the pipe; when the energy is released (e.g., when the BHA disengages from the bottom of the well bore), the recoil of the drill pipe can cause violent axial (lateral) motion in the drill pipe and potentially cause damage to the BHA. These erratic torque events and unintended forces adversely impact performance of the drill string and BHA, and may reduce overall rate of penetration since the drill bit does not function efficiently at all times.

The proposed solution of introducing a percussive or hammering effect, also mentioned above, may appear to make up for these problems by increasing the rate of penetration simply due to the energy of the hammering effect. In some prior art solutions, this energy is created at the expense of drilling fluid pressure below the percussion tool due to the effect of the percussion tool on fluid flow below the tool, and at the expense of additional significant length in the drill string due to the addition of the tool.

The present embodiments and examples accordingly provide an improved bearing assembly for use in a downhole drill string for generating and controlling linear oscillating effects in a mandrel and other downhole components to compensate for dissipative forces and erratic torque events in the drill string. The assembly comprises a fluid restrictor assembly driven by a motor, a rotating valve component of which is mounted to a mandrel, to which a drill bit may be attached. The mandrel passes through an oscillation assembly which can induce linear motion in the mandrel depending on the relative position of the mandrel within the assembly. The oscillation assembly can respond to unplanned effects, such as the erratic forces and impulses mentioned above.

Advantageously, the assembly can be provided in the BHA so as to provide its benefits without substantially adding to the overall length of the drill string. Use of the assembly in the drill string may mitigate the effect of uncontrolled impulses in the drill string, and may improve overall weight transfer to the drill bit and contact between the drill bit and the bottom of the well bore without using a hammering or percussive effect.

Figure 1:
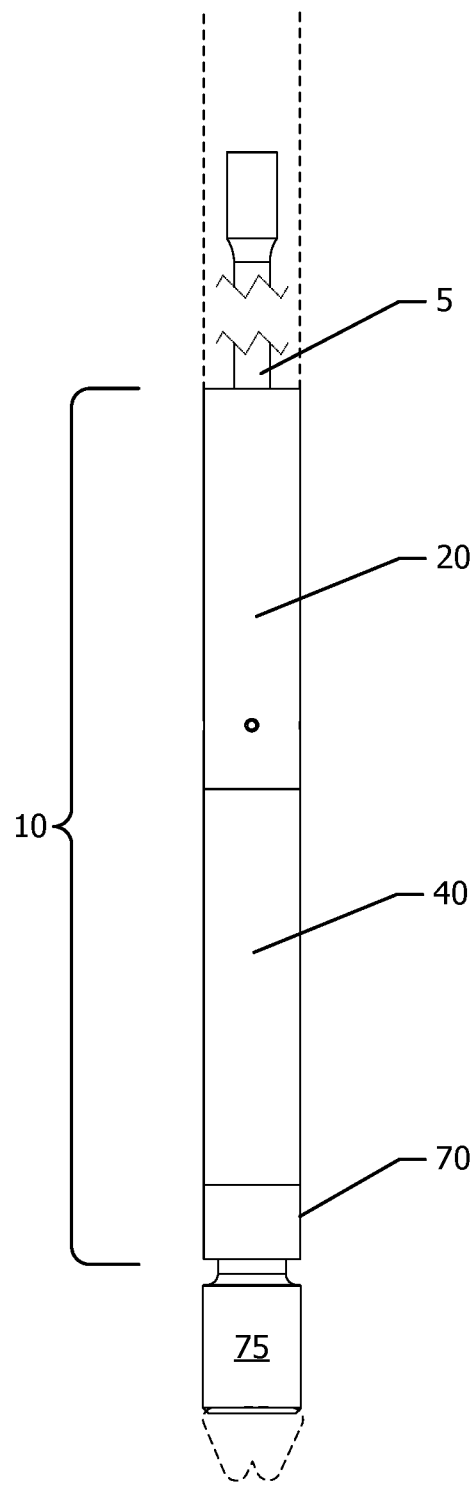
FIG. 1 depicts a downhole bearing assembly including a fluid restrictor portion and a reactive portion within a drill string.
Figure 2:
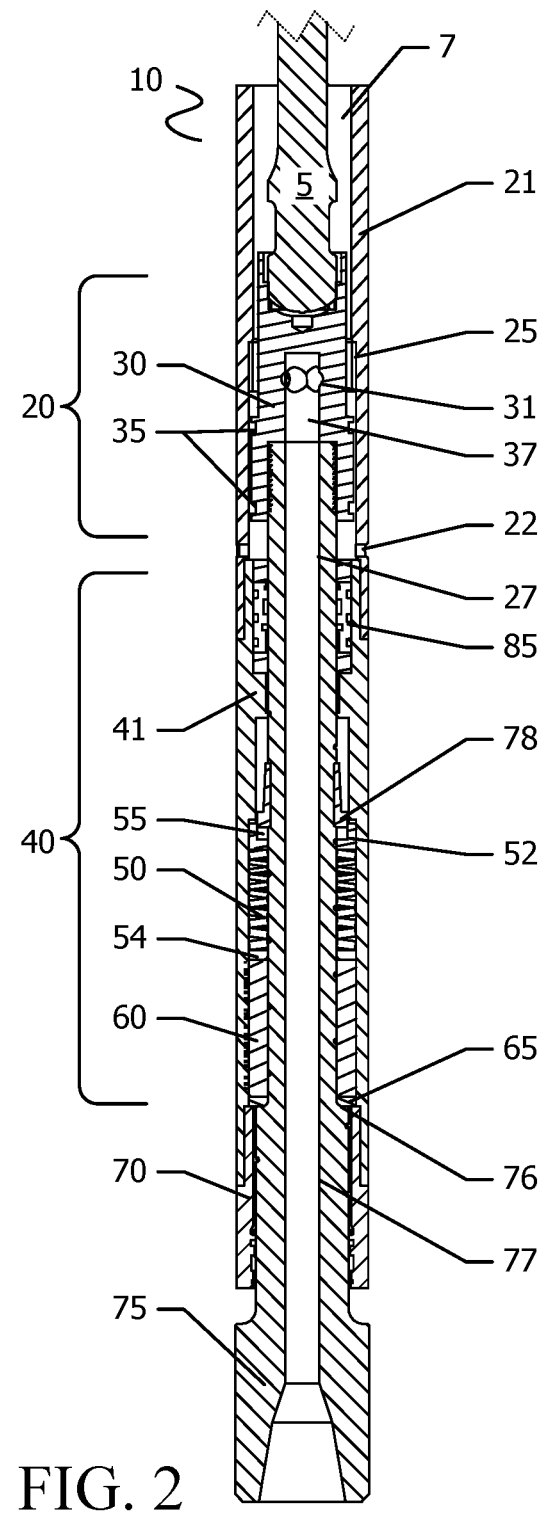
FIG. 2 is a lateral cross-sectional view of the downhole bearing assembly of FIG. 1.

FIGS. 1 and 2 illustrate lateral views of an embodiment of the downhole bearing assembly 10 as referenced above, with FIG. 2 being a lateral cross-section of the substantial part of the assembly 10 of FIG. 1 within a drill string (indicated in phantom), and specifically a BHA. The bearing assembly 10 comprises a fluid restrictor portion 20 and a reactive portion 40 supporting a mandrel 75. Other components of the BHA may be connected to the top of the bearing assembly 10, such as a mud motor (e.g., a Moineau principle motor comprising a rotor and stator). A drill bit can be mounted to the mandrel 75 projecting from the lower end of the assembly 10. The exterior of the assembly 10 is defined by interconnected fluid restrictor housing 21, reactive portion housing 41, and seal housing 70, which are provided as independent components to facilitate assembly, transport, and repair of the assembly 10. These housing components 21, 41, 70, as well as other components of the assembly 10, can be connected or mounted to each other using appropriate connector means, such as threaded connections. As those skilled in the art will appreciate, in some implementations the configuration or length of one or more of these housing components 21, 41, 70 may be modified and/or combined without affecting the operation of the inventions described herein.

The fluid restrictor housing 21 houses fluid restrictor assembly components in an upper portion of the assembly 10. The fluid restrictor assembly includes a rotatable piston valve component 30 and stationary valve component 25. The piston valve component 30 cooperates with a stationary valve component 25 mounted within the fluid restrictor housing 21. As described below, the two valve components 25, 30 are provided with one or more corresponding inlets (not indicated in FIG. 1 or 2). The piston valve component 30 includes one or more ports 31 providing for fluid communication from the inlets of the piston valve component 30 to a central passage or bore 37. As the piston valve component 30 rotates within the housing 21 and the stationary valve component 25, their respective inlets enter into and out of alignment causing variations in drilling fluid flow and thus variations in fluid pressure above the piston valve component 30, thereby causing axial motion of the piston valve component 30 within the assembly 10. The piston valve component 30 is thus referred to as a "piston" in view of its axial movement which, as more fully explained below, induces movement in other components as well as compression of an oscillation assembly.

When the bearing assembly 10 is in place in the drill string, the fluid restrictor portion 20 is operatively coupled at an upper end to the motor (not shown). In this example a driveshaft 5, a portion of which is shown in FIGS. 1 and 2, is coupled to both the rotor of the motor and the piston valve component 30 and transmits torque from the rotor to the piston valve component 30. Appropriate rotor/stator ratios for the motor may be selected to drive the piston valve component 30 according to desired frequency of operation and torque. The driveshaft 5 may be directly coupled to the rotor and the piston valve component 30 using universal joints.

The fluid restrictor portion 20 is also coupled to the mandrel 75, which extends below the fluid restrictor housing 21, through the reactive portion 40 and the seal housing 70. As can be seen in FIG. 2, a lower end of the piston valve component 30 is coupled to an upper end of the mandrel 75. The coupling may be a threaded coupling or other suitable attachment. The bore 37 of the piston valve component 30 is in fluid communication with a bore 77 of the mandrel 75 to define a passage 27 through the fluid restrictor-mandrel assembly. A floating piston 85 is provided around an upper portion of the mandrel 75 below the fluid restrictor portion 20, and in the illustrated embodiment, may travel within the reactive portion housing 41 and the fluid restrictor housing 21 as the mandrel 75 moves upwards and downwards in the assembly 10. The piston 85 assists in balancing pressure on the seals of the bearing assembly without loss of drilling fluid through the housing ports 22. It will be understood that references to "upwards" and "downwards" in the context of lateral drilling refers to the surface direction and the well bore bottom (e.g., drilling face) direction, respectively.

A locking ring 78 is mounted to, and projects outwardly from, the mandrel 75 to assist in imposing linear travel limits on the mandrel 75 and to retain the mandrel 75 within the bearing assembly 10. The locking ring 78 provides a projecting surface that can engage other surfaces within the reactive portion 40. The mandrel 75 may be coupled to other components in the drill string, in particular to a drill bit.

The reactive portion housing 41 and the mandrel 75 define a space within the housing 41, which contains an oil-filled oscillation or spring assembly 50, which in this example comprises an assembly of Belleville washers 50 retained between a movable upper guard ring 52 and a lower guard ring 54. The lower guard ring 54 may be a spring washer. The spring assembly 50 is positioned between a movable off-bottom bearing 55 and a stationary on-bottom bearing 60. The on-bottom bearing is mounted to the housing 41, and a thrust washer 65 may be provided at the lower end of the on-bottom bearing 60 where an exterior shoulder 76 of the mandrel 75 will engage the on-bottom bearing 60 when the mandrel 75 is at a highest point of travel within the bearing assembly 10. When the spring assembly 50 utilizes Belleville washers, the washers may be arranged either in series or in parallel, and the assembly can optionally comprise different washer sizes. In one implementation, the set of washers can be arranged in order of size. The spring assembly 50 is sealed to retain the oil in the reactive portion 40.

FIG. 3 is a lateral cross-section of the fluid restrictor housing 21. The exterior of the bearing assembly 10 is typically generally cylindrical, and thus the exterior surface 201 of the fluid restrictor housing 21 substantially defines a cylindrical shape as well. However, interior or exterior dimensions of the housing 21 at either end may be sized or configured differently so as to provide a connection means, where necessary, with adjoining housing or other components of the drill string. For instance, in the example fluid restrictor housing 21 in FIG. 3, the interior dimension of the generally cylindrical wall of the housing 21 at a lower portion 208 is enlarged to accommodate a connection with the reactive portion housing 41. The connection may be threaded. Generally, it will be appreciated by those skilled in the art that the attachment of individual components to one another in the assembly 10 can be accomplished using any appropriate coupling means known in the art, and the examples illustrated in the accompanying drawings and described herein should not be considered limiting.

In this particular example, the interior surface of the cylindrical wall gradually enlarges from a first diameter at an upper portion 202 to a second, larger diameter at a midsection 206, and finally to the third, largest diameter at the aforementioned lower portion 208. In this example, an interior shoulder 204 is defined at the junction of the upper portion 202 and midsection 206. This interior shoulder 204 defines a position for the stationary valve 25, as can be seen in FIG. 2.

FIG. 4 is a lateral cross-section of the reactive portion housing 41. Again, the housing 41 is substantially cylindrical with portions of varying interior or exterior diameter in this specific example. The exterior dimension of the top end of the housing 41 is sized to cooperate with the lower portion of the fluid restrictor housing 21. The interior diameter of the reactive portion housing 41 enlarges from a first diameter at the top end 400, which is sized to receive the mandrel 75 and a surrounding floating piston 85, to a narrower diameter at a neck portion 404. An interior shoulder 402 facing the top end 400 is defined at the junction of the top end 400 and the neck portion 404. This shoulder 402, as can be seen in FIG. 2, defines a lower travel limit for the floating piston 85. The interior dimension of the neck portion 404 is large enough to admit passage of the mandrel 75 therethrough.

Below the neck portion 404, the interior dimension of the housing 41 increases from a first intermediate portion 406, to a second intermediate portion 409, to a bottom end 412. Another intermediate shoulder 408 defined by the junction of the first and second intermediate portions 406, 409 faces towards the bottom end 412, and with the interior surface of the second intermediate portion 409, defines a region for receiving the oscillating assembly 50. As can be seen in FIG. 2, the on-bottom thrust bearing 60 is also positioned within the second intermediate portion 409. The on-bottom thrust bearing 60 defines an interior cavity sized to permit passage of the mandrel 75 therethrough, while also defining the region for receiving the oscillating assembly. The interior dimension of the bottom end 412 is configured to mate with a corresponding end of the seal housing 70.

A cross-sectional view of the seal housing 70 is shown in FIG. 5. An upper end 700 of the seal housing is dimensioned to mate with the reactive portion housing 41. An interior surface 704 of the seal housing 70 is configured to receive one or more wiper seals that engage the mandrel 75, as illustrated in FIG. 2.

Figure 6A:
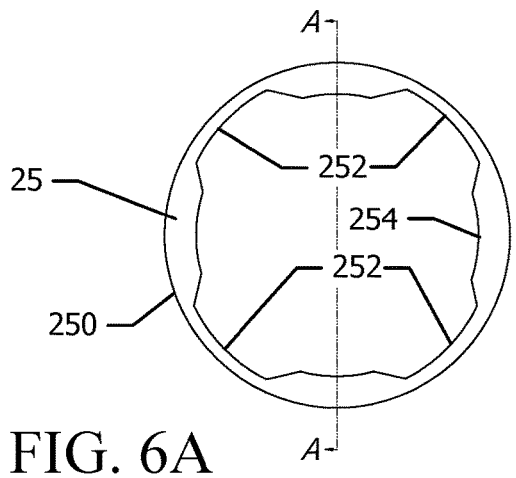
FIGS. 6A and 6B are top and lateral cross-sectional views, respectively, of a stationary valve component of the downhole bearing assembly.
Figure 6B:
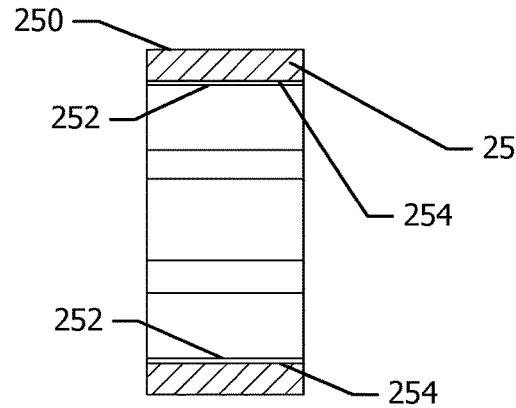

Turning to the fluid restrictor components of the assembly 10, FIG. 6A is a top view of the stationary valve component 25. The exterior 250 of the valve component 25 is dimensioned to be fit in a substantially sealing engagement with the interior of the fluid restrictor housing 21. The interior wall 254 of the valve 25 is provided with at least one inlet 252 defining a passage for fluid; in this example, the interior wall 254 is dimensioned to receive the piston valve component 30. FIG. 6B is a cross-sectional view of the stationary valve component 25 taken along line A-A. This illustrates the different interior diameters of the valve component 25 at the inlets 252 and the interior wall 254. The shape, size, and number of the inlets 252 can be selected according to the desired frequency and pressure patterns, or drilling fluid flow rates for a given drilling fluid to be achieved in the assembly 10. In this example, the inlets 252 are formed as recesses or indents in the interior wall 254 of the stationary valve component 25. These recesses can have obliquely angled walls, as illustrated in the figures, or take other shapes. Conversely, the stationary valve component 25 could be described as a substantially cylindrical valve having restrictive pads or surfaces 254 projecting inwardly from an interior of the component 25. Adjacent restrictive pads or surfaces define inlets 252 between them for fluid flow.

Figures 7A, 7B:
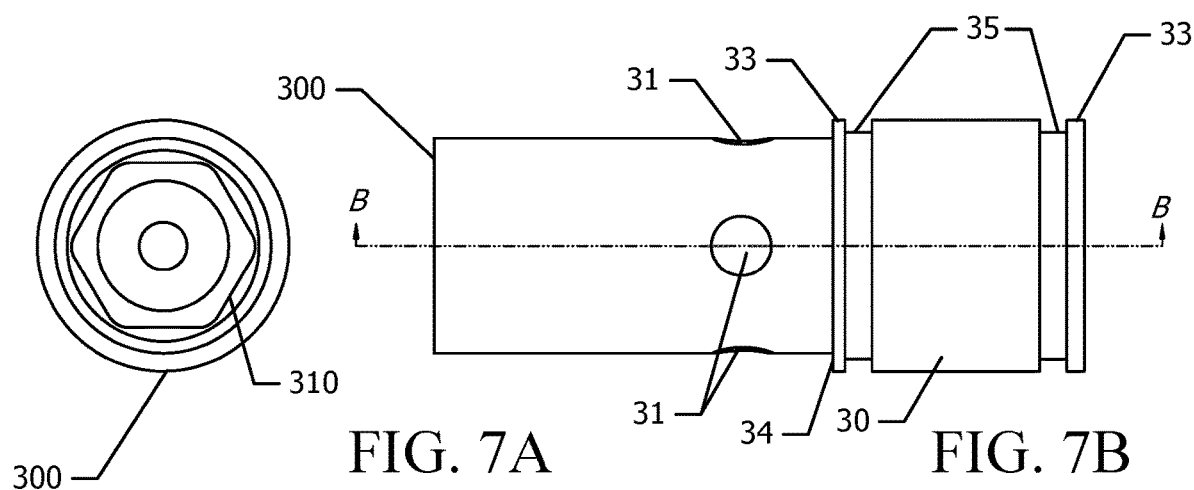
FIGS. 7A, 7B, and 7C are a top view, a side elevation, and a lateral cross-sectional view, respectively, of a piston valve component of the downhole bearing assembly.
Figure 7C:
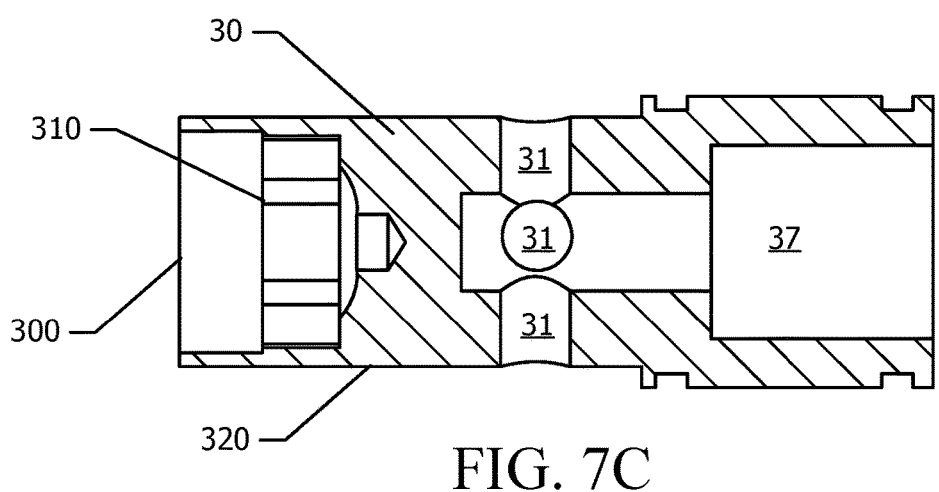

FIGS. 7A, 7B, and 7C illustrate an example rotatable piston valve component 30. This valve component 30 rotates within the stationary valve component 25. FIG. 7A is a top view of the valve component 30, showing the top end 300 that includes a coupling means 310 for coupling to the driveshaft 5 as shown in the example of FIG. 2. FIG. 7B is a side elevation of the valve component 30, illustrating positions of the ports 31 at the exterior of the valve component 30. The valve component 30 may have one, two, three, or more ports 31; in this example, the component 30 is provided with four ports, three of which are visible in FIGS. 7B and 7C. The valve component 30 is substantially cylindrical having a first diameter sized to fit within the stationary valve component 25. The body of the valve component 30 is also provided with recesses 35 to receive seals (not shown) to seal the valve component 30 to the interior surface of the fluid restrictor housing 21. In the example of FIG. 7B, these recesses 35 are defined between an enlarged portion of the body of the valve component 30 and projecting flanges 33. The enlarged portion may be formed integrally with the valve component 30, or may be provided by a separate component attached to the valve component 30. The upper flange 33 defines an upper annular face 34, which is oriented towards the top end of the valve component 30.

FIG. 7C is a cross-sectional view of the valve component 30 taken along the line B-B of FIG. 7B, showing the arrangement of the ports 31 with respect to the bore 37 of the valve component 30. It can be seen that the ports 31 intersect with the bore 37 (in this example, the diameter of the bore 37 is reduced at the intersection with the ports 31; in other implementations, the diameter of the bore 37 may be constant throughout, or larger proximate to the ports 31). Thus, the ports 31 provide access to the bore 37 from an exterior surface 320 of the piston valve component 30.

FIGS. 8A through 9C illustrate states of the fluid restrictor portion 20 during operation of the assembly 10. FIG. 8A is a lateral view of the two valve components 25, 30, in combination, with the piston valve component 30 disposed inside the stationary valve component 25 in a first alignment. FIG. 8B is a cross-section of the fluid restrictor portion taken at lines C-C, showing that the piston valve component 30 fits within the interior wall 254 of the stationary valve component 25. The exterior surface 320 of the piston valve component 30 sufficiently engages the interior wall 254 of the stationary valve component 25 so as to substantially block drilling fluid flow between the two components 25, 30 at the points of engagement. In a first alignment illustrated in FIGS. 8A-8C, one or more ports 31 that provide communication between the bore 37 of the piston valve component 30 and the exterior of that component 30 are substantially aligned with one or more inlets 252 in the stationary valve component 25. Thus, as can be seen more clearly in FIG. 8C, which is a cross-section of the fluid restrictor portion 20 of FIG. 8A taken at line D-D, fluid can pass into an inlet 252 and through an aligned port 31 into the bore 37. This first alignment can be referred to as the fluid restrictor portion 20 being in an "open" state, as fluid flow into the ports 31 and down to the bore 37 is possible. Where the size of the passage for fluid into the ports 31 is maximized in an open state, the fluid restrictor portion 20 may be considered to be "fully open".

A second alignment is shown in FIGS. 9A-9C. FIG. 9A illustrates the fluid restrictor portion comprising the stationary valve component 25 coupled to the piston valve component 30. FIG. 9B is a cross-section of the view of FIG. 9A along E-E; in this case, it will be appreciated that the stationary valve component 25 is being shown rotated relative to its position in FIG. 8B, but the stationary valve position is substantially fixed within the valve housing 41 while the piston valve component 30 rotates as it is driven by a motor. FIG. 9C is a cross-section of FIG. 9A at F-F. In this second alignment, drilling fluid flow into the inlets 252 and into the ports 31 is substantially blocked by engagement of the exterior surface 320 of the piston valve component 30 with the interior wall 254 of the stationary valve component 30. This alignment can be referred to as a "restricted" state of the fluid restrictor portion 20. It may be noted that the engagement between the exterior surface 320 and the interior wall 254 may not be perfectly sealed, and some leakage of drilling fluid past the valve components 25, 30 to the space above the upper face 34 of the flange 33 may occur; however, fluid flow is still substantially restricted through the fluid restrictor portion 20 compared to the open state.

In operation, the piston valve component 30 will rotate within the stationary valve component 25 between open and restricted states, and there will be intermediate open states in which a given port 31 will be partially coincident with an inlet 252, so as to permit some fluid flow into the bore 37. Thus, fluid flow through the fluid restrictor portion 20 will vary between a maximum and a minimum flow rate; depending on the relative sizes, numbers, and orientations of the ports 31 and inlets 252, the variations in flow rate may be regularly periodic or less regular. In some arrangements, such as the arrangement illustrated in the accompanying figures, the minimum flow rate may be zero or near zero; the maximum flow rate may be all, or substantially all, of the fluid entering the fluid restrictor portion 20 from above. An example size for the diameter of a circular port 31 is about 1.125" to 1.375", with a bore 37 diameter of about 2.25" to about 3.285". However, as noted, not all ports 31 and inlets 252 need be a consistent size; some ports 37 and/or some inlets 252 may be differently sized to introduce further variation to the fluid flow. In other arrangements, there may be an unequal number of ports 31 and inlets 252, or the ports 31 and inlets 252 may be positioned on their respective valve components such that in some alignments, at least one port 31 is wholly or substantially wholly aligned with an inlet 252 to permit fluid flow, while at least one other port 31 is wholly or substantially wholly blocked by the interior wall 254 of the stationary valve component 25.

Figure 10A:
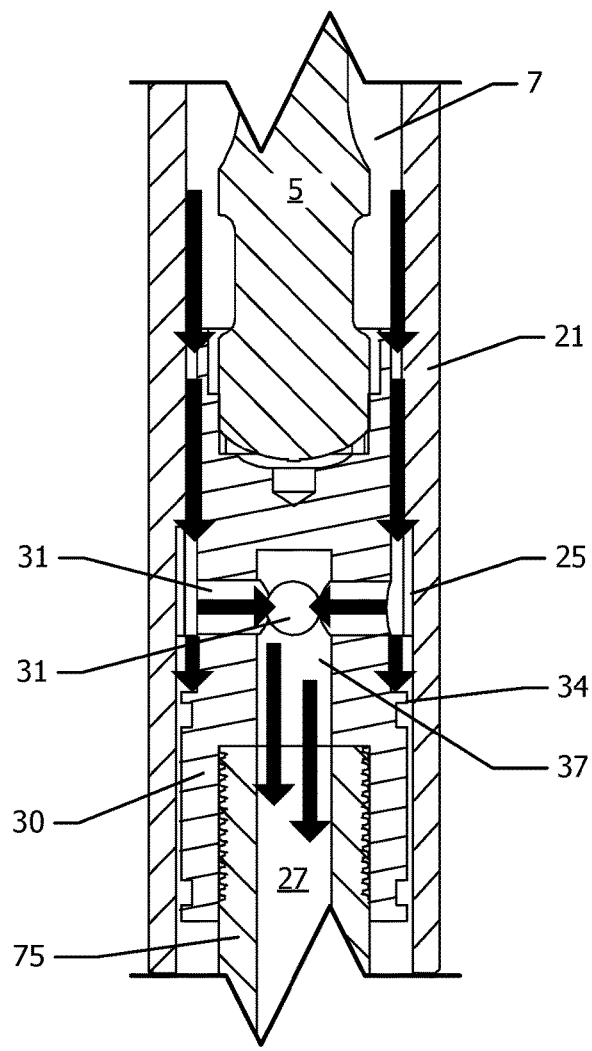
FIGS. 10A and 10B are cross-sectional views illustrating a portion of the downhole bearing assembly comprising the stationary and piston valve components in the first and second states, respectively.
Figure 10B:
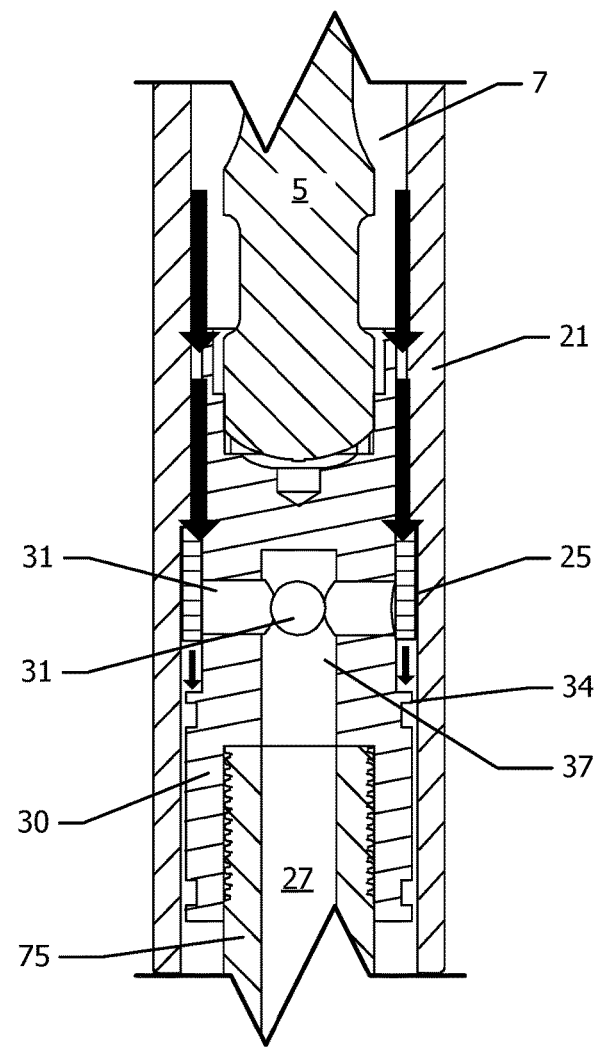

Those skilled in the art will readily appreciate the effect on fluid flow during operation of the fluid restrictor portion 20. FIGS. 10A and 10B illustrate a section of the assembly 10 and the driveshaft 5. The interior space of the fluid restrictor housing 21 defines an interior space or passage 7 into which drilling fluid exiting the motor upstream from the assembly 10 can enter. Fluid entering the passage 7 flows towards the piston valve component 30 and stationary valve component 25. When the motor is active, the piston valve component 30, driven by the rotor via the driveshaft 5, rotates within the stationary valve component 25. The fluid restrictor portion 20 thus transitions between open and restricted states as described above. When the fluid restrictor portion 20 is in an open state as in FIG. 10A, where at least some portion of an inlet 252 (not indicated in FIG. 10A or 10B) is aligned in whole or in part with a corresponding port 31 in the piston valve component 30, at least some drilling fluid can flow from the passage 7 and through a coincident port 31, into the bore 37 and thus passage 27. This fluid passes through the mandrel 75 and down to further components, such as the drill bit. Some drilling fluid from the passage 7 may bypass the port 31 and instead collect below the inlets 31 above the upper annular face 34 of the piston valve component 30. The arrows in FIG. 10A indicate possible flow of drilling fluid in the assembly 10 while the fluid restrictor portion 20 is in an open state. The drilling fluid flow in this state can thus result in some pressure on the piston valve component 30, depending on how accessible the ports 31 are as a result of the interference of the stationary valve component 25. When the fluid restrictor portion 20 is in an intermediate state between the fully open and restricted states, the pressure on the piston valve component 30 may be somewhat higher than when the fluid restrictor portion is in the fully open state and more fluid passes down through the passage 20.

When the fluid restrictor portion is in a restricted state as in FIG. 10B, substantially all drilling fluid flowing in from the passage 7 is blocked from entering the ports 31 and passage 27, although as noted above some leakage may occur. The blockage of fluid results in increased pressure applied to the upper surfaces of piston valve component 30. Some pressure may be transferred to any fluid trapped below the stationary valve component 25. Thus, as the piston valve component 30 rotates under influence of the motor, fluid flow is intermittently restricted due to interaction of the piston valve component 30 with the stationary valve component 25. This intermittent restriction generates variations in pressure bearing down on the piston valve component 30 and variations in fluid flow rate through the passage 27.

FIGS. 11A, 11B, and 11C illustrate the effect of pressure on the reactive portion 40 of the bearing assembly 10. These figures illustrate a section of the reactive portion 40 comprising the spring assembly 50 and neighbouring components. In FIG. 11A, the spring assembly 50 is in a compressed state, which could result from pressure in the drill string originating above the reactive portion 40 causing the mandrel 75 to move to its lowest position with respect to the reactive portion 40. Note that the spring assembly 50 may not be completely compressed in this state. The locking ring 45, which has been moved downwards towards the off-bottom bearing 55, contacts the off-bottom bearing 55 and pushes it down until it engages and bears down on the upper guard 52 of the spring assembly 50. This moves the upper guard 52 downward, compressing the spring assembly 50. Potential energy is thus stored in the spring assembly 50.

When the pressure bearing down on the mandrel 75 from above is released, the spring portion can recoil and return to a more relaxed state, as shown in FIGS. 11B and 11C. FIG. 11B illustrates an intermediate position of the reactive portion 40 as the spring assembly 50 decompresses. Force exerted by the decompressing spring assembly 50 pushes upwards against the upper guard 52 and off-bottom bearing 55, and against the locking ring 45 to push the mandrel upwards with respect to the spring assembly 50. Since the off-bottom bearing 55 moves freely with respect to the upper guard 52 and the locking ring 45, once the spring assembly 50 starts to recoil the upper guard 52, off-bottom bearing 55, and/or locking ring 45 may lose contact with each other as the impulse of the recoiling spring assembly 50 transfers kinetic energy to these components and they begin moving in the reactive portion 40.

FIG. 11C illustrates a possible limit of travel of the mandrel 45 and a maximum decompressed state for the spring assembly 50. In this state, the upper guard 52 engages the interior shoulder 408 of the reactive portion housing 41, arresting any further expansion of the spring assembly 50, if the spring assembly 50 is not fully relaxed already. At its highest position with respect to the bearing assembly 10, the position of the mandrel 75 may be limited by the exterior shoulder 76 of the mandrel 75 engaging the thrust washer 65 or bottom of the on-bottom bearing 60, as illustrated in FIG. 2. In this position, there may be sufficient clearance between the locking ring 45 and the upper guard 52 to permit the off-bottom bearing 55 to float freely, as can be seen in FIG. 11C.

It will be understood by those skilled in the art that the spring assembly 50 can be cyclically and/or intermittently compressed under the influence of forces exerted on either end of the spring assembly 50 (i.e., on the off-bottom bearing 55 or on the on-bottom bearing 60) as a result of the operation of the fluid restrictor portion 20, and forces exerted on the BHA at the drill bit or upstring from the BHA. As torque from the motor is applied to the piston valve component 30, the fluid restrictor portion 20 operates to cyclically vary fluid flow through the passage 27, thereby inducing fluctuations in fluid pressure bearing on the piston valve component 30. This causes small axial movements in the position of the piston valve component 30, causing the piston valve component 30 to vibrate up and down. As the component 30 is directly mounted to the mandrel 75, the mandrel 75 can likewise vibrate. The movement of the mandrel 75 may cause the locking ring 45 to engage and/or disengage the off-bottom bearing 55, thereby causing cyclic compression and relaxation of the spring assembly 50, although the range of motion of these movements may be insufficient to fully compress the spring assembly 50. The response of the oil-filled spring assembly 50 dampens the vibrations to reduce the likelihood of damaging instruments in the BHA.

If the drill bit is in contact with the well bore bottom with sufficient weight transfer for drilling, the spring assembly may be partially compressed due to the force applied to the drill bit. The reactive portion 40 may thus be in an intermediate state similar to FIG. 11B. Increased impulses from the drill string above the BHA and bearing downwards on the mandrel 75 (for example, due to recoil after the drill string recovers from compression or buckling) may induce undesirable results at the drill bit or in the motor. With the bearing assembly 10, these unpredicted or erratic impulses may be mitigated at least in part by the reactive portion 40, since the spring assembly 50 may compress further and absorb the shock of the impulse. At the same time, the vibrations induced by the fluid restrictor portion 20 can assist in providing faster recovery of the spring assembly 50 after compression due to erratic impulses because the rotating piston valve component 30 intermittently relieves fluid pressure above the mandrel 75, permitting the spring assembly 50 to decompress at least partially in response as the force exerted downwards by the locking ring 45 on the mandrel 75 is reduced.

If, on the other hand, unintended forces at the drill bit force the mandrel 75 upwards and cause a loss of contact between the drill bit and the bottom, the spring assembly 50 will be able to relax from its current compressed state to a less compressed state, causing the mandrel 75 to move relative to the housing 41 and assist in reengaging the drill bit. This relaxation, again, is assisted by the intermittent vibrations created by the fluid restrictor portion 20 which permits the spring assembly 50 to at least partially decompress, as described above.

Thus, the combination of the fluid restrictor portion 20 and the reactive portion 40 in the bearing assembly 10 assists in absorbing shocks originating both upstring at the drill bit, protecting components of the BHA, while assisting in maintaining weight transfer at the bit. The fluid restrictor portion 20 may aid the recovery of the spring assembly 50 after shock absorption to allow the spring assembly 50 to return to a relaxed or less compressed state faster than the spring assembly 50 would on its own. This can improve the efficiency of the drilling operation without necessarily relying on potentially damaging hammer effects, or requiring higher torque from the motor.

Furthermore, the inclusion of the bearing assembly 10 in the BHA provides the advantages of the fluid restrictor portion 20 and the reactive portion 40 without appreciably adding to the length of the drilling string. The fluid restrictor portion 20 and the reactive portion 40 are effectively coupled to each other by direct connection of the mandrel 75 to the piston valve component 30 so that these two components move together under influence of fluid pressure or impulses generated elsewhere in the drill string. This improves steerability of the BHA during lateral drilling operations compared to prior art configurations that require the addition of further components that add to the length of the drill string.

The foregoing implementation makes use of a nested or concentric fluid restrictor portion arrangement, with the piston valve component 30 seated within the interior of the stationary valve component 25 to intermittently restrict drilling fluid flow to downhole components of the bearing assembly. It will be appreciated from the foregoing description and figures that all, or substantially all, of the drilling fluid exiting the motor flows through the passage 27 and down to the drill bit or other components mounted to the mandrel 75, because the piston valve component 30 is sealed to the fluid restrictor housing 21. Other implementations may be used in place of this concentric arrangement, provided rotational motion and linear motion are induced in the mandrel 75 by an upstream motor and fluid pressure variations resulting from operation of the fluid restrictor portion, respectively.

In some implementations, a piston valve component 30 with a bypass can be provided to control the pressure in the assembly 10 when the fluid restrictor portion is in the restricted state. FIG. 12A illustrates the piston valve component 30 and the stationary valve component 25 as depicted earlier; however, bypass ports 312 communicating with the interior bore 37 of the piston valve component 30 are provided in the piston valve component 30 below the stationary valve component 25. FIG. 12B is a cross-section of the fluid restrictor portion taken at line G-G, showing the valve in an open state with inlets 252 aligned with corresponding ports 31. FIG. 12C is a cross-section of the fluid restrictor portion of FIG. 12A taken at line H-H, showing the orientation of the bypass ports 312 relative to the fluid restrictor portion. These bypass ports 312 communicate with the space defined between the housing 21 (not shown in FIGS. 12A-12D) and the bore 37, permitting fluid passage into the bore 37. This is more clearly illustrated in FIG. 12D, which is a cross-section of the fluid restrictor portion taken at line M in FIG. 12A. It will be understood by those skilled in the art that even when the fluid restrictor portion is in its restricted state and the interior surface 254 of the stationary valve component 25 interferes with fluid flow into the ports 31, fluid retained below the stationary valve component 25 can still flow into a bypass port 312, resulting in a decrease of pressure above the piston valve component 30 and permitting some amount of drilling fluid flow through the passage 27 regardless whether the fluid restrictor portion is in a restricted or open state. The number, shape, and arrangement of bypass ports can be varied as required; there may be one, two, three, or more bypass ports in the piston valve component 30.

Throughout the specification, terms such as "may" and "can" could be used interchangeably and use of any particular term should not be construed as limiting the scope or requiring experimentation to implement the claimed subject matter or embodiments described herein. Various embodiments of the present invention or inventions having been thus described in detail by way of example, it will be apparent to those skilled in the art that variations and modifications may be made without departing from the invention(s). The inventions contemplated herein are not intended to be limited to the specific examples set out in this description. The inventions include all such variations and modifications as fall within the scope of the appended claims.

The invention claimed is:

1. A bottom hole assembly for use in a drill string, the bottom hole assembly comprising:
   a fluid restrictor portion comprising a piston valve component disposed in a stationary valve component, the piston valve component and stationary valve component arranged to generate fluid pressure variations, the fluid pressure variations causing axial movement of the piston valve component;
   a mandrel mounted to the piston valve component; and
   a reactive portion comprising an oscillation assembly mounted between a housing and the mandrel, the oscillation assembly responsive to movement of the mandrel in the housing applying force to the oscillation assembly.

2. The bottom hole assembly of claim 1, wherein the piston valve component comprises at least one port communicating with a bore of the piston valve component, the bore of the piston valve component in fluid communication with a bore of the mandrel;
   the piston valve component being configured to rotate in the stationary valve component, the rotation causing drilling fluid passage through the ports into the bores of the piston valve component and the mandrel to be cyclically or intermittently restricted, the restriction of the drilling fluid thus generating the fluid pressure variations.

3. The bottom hole assembly of claim 1, further comprising a motor having a stator and a rotor, the rotor being coupled to the piston valve component to thereby impart rotational motion to the piston valve component.

4. The bottom hole assembly of claim 1, wherein the oscillation assembly comprises a spring assembly disposed between a movable off-bottom bearing and an on-bottom bearing.

5. The bottom hole assembly of claim 4, wherein the mandrel comprises a projection extending from the mandrel, the projection being capable of engaging the off-bottom bearing to cause compression of the spring assembly.

6. The bottom hole assembly of claim 4, wherein the on-bottom bearing is mounted to the housing.

7. The bottom hole assembly of claim 6, further comprising a thrust washer mounted in the housing below the on-bottom bearing.

8. The bottom hole assembly of claim 1, wherein the spring assembly is a sealed oil-filled spring assembly.

9. The bottom hole assembly of claim 1, wherein the drill string is used to drill a well bore, the bottom hole assembly further comprising a drill bit mounted to the mandrel.

10. The bottom hole assembly of claim 9, wherein the movement of the mandrel includes movement caused by the axial movement of the piston valve component, and movement caused by forces applied to the bottom hole assembly by another part of the drill string or by a force applied by the drill bit.

11. A bearing assembly for use in a bottom hole assembly of a drill string, the bearing assembly comprising:
    a fluid restrictor portion configured to be driven by a motor of the bottom hole assembly and to generate axial movement of a mandrel of the bottom hole assembly; and
    a reactive portion comprising an oscillation assembly operative to respond to forces imparted by movement of the mandrel, the movement of the mandrel being caused by the fluid restrictor portion and by forces applied to the bottom hole assembly by another part of the drill string or by a force applied by the drill bit, wherein the fluid restrictor portion and the reactive portion are coupled to each other by the mandrel.

12. The bearing assembly of claim 11, wherein the fluid restrictor portion comprises a piston valve component disposed in a stationary valve component, the piston valve component and stationary valve component arranged to generate fluid pressure variations, the fluid pressure variations causing axial movement of the piston valve component, the piston valve component being mounted directly to the mandrel.

13. The bearing assembly of claim 11, wherein the mandrel comprises a projection extending from the mandrel, the projection being capable of engaging reactive portion to cause compression of the oscillation assembly.

14. The bearing assembly of claim 11, wherein the bearing assembly is disposed between a motor of the bottom hole assembly and a drill bit mounted to the mandrel.

15. A bottom hole assembly comprising the bearing assembly of claim 11, the bottom hole assembly comprising the mandrel and a drill bit mounted to the mandrel.

* * * * *